United States Patent [19]
Lenk

[11] Patent Number: 5,233,287
[45] Date of Patent: Aug. 3, 1993

[54] CURRENT LIMITING BILATERAL CONVERTER HAVING A GROUND REFERENCED CURRENT SENSOR

[75] Inventor: Ronald J. Lenk, Mountain View, Calif.

[73] Assignee: Space Systems/Loral, Palo Alto, Calif.

[21] Appl. No.: 878,776

[22] Filed: May 5, 1992

[51] Int. Cl.$^5$ .............................. G05F 1/59
[52] U.S. Cl. ......................... 323/268; 323/222; 323/225; 323/906; 363/16; 361/18; 361/93; 361/111
[58] Field of Search ............... 323/222, 225, 259, 268, 323/284, 350, 351, 906; 363/15, 16, 95, 55, 56, 50, 124; 361/18, 79, 86, 87, 93, 111

[56] References Cited

U.S. PATENT DOCUMENTS

| | | | |
|---|---|---|---|
| 4,618,812 | 10/1986 | Kawakami | 323/268 X |
| 4,672,303 | 6/1987 | Newton | 323/285 |
| 4,672,518 | 6/1987 | Murdock | 363/21 |
| 4,727,308 | 2/1988 | Huljak et al. | 323/222 |
| 4,736,151 | 4/1988 | Dishner | 323/222 X |
| 4,743,812 | 5/1988 | Dishner | 318/14 |
| 4,801,859 | 1/1989 | Dishner | 323/222 X |
| 4,811,184 | 3/1989 | Koninsky et al. | 363/17 |
| 4,958,121 | 9/1990 | Cuomo et al. | 361/111 X |
| 4,964,029 | 10/1990 | Severinsky et al. | 323/224 X |
| 4,974,141 | 11/1990 | Severinsky et al. | 323/224 X |
| 5,138,249 | 8/1992 | Capel | 323/283 |
| 5,164,657 | 11/1992 | Gulczynski | 323/285 X |

Primary Examiner—Emanuel T. Voeltz
Attorney, Agent, or Firm—Perman & Green

[57] ABSTRACT

A bilateral power conversion circuit (30) includes a current sensor that includes a resistance ($R_s$) coupled in series between a first terminal of a switch (SW2) and a ground potential. The current sensor has an output for providing an over-current signal to an input of a control circuit (24) during a time that the circuit is sinking current from a load and also during a time when the circuit is sourcing current to the load.

11 Claims, 2 Drawing Sheets

CURRENT LIMITING BILATERAL CONVERTER HAVING A GROUND REFERENCED CURRENT SENSOR

The invention described herein is a subject invention under U.S. Government contract No. NAS3-25082, subcontract No. R80SIA88561105, and as such the U.S. Government may have rights therein.

CROSS-REFERENCE TO A RELATED PATENT APPLICATION

This patent application is related to commonly assigned U.S. patent application Ser. No. 07/818,842, filed Jan. 10, 1992, and entitled "Bilateral Power Converter for a Satellite Power System".

FIELD OF THE INVENTION

This invention relates generally to power conversion apparatus and, in particular, to DC-DC switching converters.

BACKGROUND OF THE INVENTION

Power supplies typically require some form of current-limiting so as to prevent excess currents from damaging components of the power supply during an output short circuit condition. In many power converter topologies, such as those referred to as flyback (discontinuous current), forward (continuous current), and bridge configurations, a switching device, such as a transistor, is referenced to a ground potential. It is consequently relatively straight forward to sense the output current with a resistor connected between the switching transistor and ground. A voltage developed across this resistor by the current can be used to shut off the transistor during an over-current condition.

Examples of circuits that sense a current in a source of a ground referenced switching transistor are found in U.S. Pat. Nos. 4,811,184 and 4,672,518.

However, of particular interest herein is a DC to DC converter known in the art as a buck converter.

FIG. 1 shows an example of a conventional buck converter, specifically a single quadrant-type converter. A characteristic of the buck converter is that the load voltage is equal to or less than the source voltage. A switching, or buck, transistor is connected between an unregulated DC source and an inductance (L). The inductance L functions as a current source and, in conjunction with a capacitor C, forms an LC filter that limits ripple voltage at the load. An exemplary control network includes an operational amplifier configured as a voltage comparator that generates, in conjunction with resistor R and voltage reference ($V_{REF}$), a variable duty cycle switching signal to the base of the switching transistor. It should be noted that the illustrated bipolar buck transistor could be replaced with, by example, a field effect transistor (FET) or with a gate turn-off thyristor. The free wheeling diode functions as an auto-complementary switch. That is, the free wheeling diode turns on automatically to supply the demands of the current source whenever the switching transistor is turned off, and turns off as a result of commutations driven by the source voltage whenever the switching transistor turns on.

For the buck converter of FIG. 1, the output DC voltage is given by:

Output DC voltage = D × input DC voltage, where D is the duty cycle of the switching transistor.

As can be appreciated, for the buck converter the above mentioned technique of sensing the output current with a resistor connected between the switching transistor and ground cannot be used, in that both the input and output of the switching transistor are referenced to the power bus, and not to ground potential.

It is also not possible to use the transformed inductor current, in that this current contains no DC current information.

One technique for generating an over-current indication places a resistor in series with the power bus, and then employs a differential amplifier to remove the common-mode bus voltage. However, this may be difficult to accomplish if the voltage developed across the resistor (normal-mode) is small compared to the common-mode voltage. Also, it may be difficult to provide sufficient bandwidth in the differential amplifier to generate the ground-referenced information rapidly enough to protect the circuitry from an over-current condition.

Another possible technique, and the one most commonly used, is to place a resistor in the power return path and to use the voltage induced across the resistor to sense fault currents. However, this technique generates a voltage between the power return and the output return, which may be objectionable for safety reasons. This technique may also give rise to Electromagnetic Interference (EMI) problems. A further problem is that the ground current is DC, since it is smoothed by the power supply filter, and consequently cannot be relied on to change rapidly. A still further problem results from the fact that the power elements in the buck converter are in the high-side (power bus) current path. Consequently, in the case of a ground fault, these elements may suffer excessive stress without the current sensor detecting the stress, because the excess current is shunted around the resistor by the ground fault.

In U.S. Pat. No. 4,672,303 there is described, in FIG. 8, a buck-like converter that includes a flywheel FET 32 that is connected to a control circuit so as to be turned off at a predetermined minimum level of inductor current. Current limiting circuitry is provided to insure that the current in the flywheel FET, and in the inductor, has reversed before the the gate drive is removed from the flywheel FET. The current limit circuit includes a FET 81 that is connected in parallel with the flywheel FET, and a resistor that is connected in series with the FET 81. A comparator 82 has one input referenced to ground and a second input connected between the FET 81 and the series resistor. When the flywheel FET is conducting, the parallel FET 81 is saturated, and provides a low impedance path for the voltage across the flywheel FET to the input of the comparator. The series resistance has a relatively high value. In a normal mode of operation, the control circuit is said to determine when the flywheel FET is turned off. During a current-limiting mode of operation, the comparator 82 controls the timing of the turn-off of the flywheel FET. As such, this patent does not address the sensing of a current that flows in the high-side buck transistor (31).

Another type of power conversion circuit is known as a bilateral converter. This type of converter is capable of operating in either a buck configuration or in a boost configuration. Over-current sensing in this type of converter is complicated by the fact that current is capable of flowing in two directions through circuit components, depending on whether the bilateral converter is being operated in a buck or a boost mode.

An object of this invention is to provide a bilateral power converter that employs an over-current sensing element capable of sensing current flowing in either direction through switching devices.

A further object of this invention to provide a current-limited buck converter that overcomes the aforementioned problems inherent in conventional buck converter current-limiting approaches.

A still further object of the invention is to overcome the disadvantages inherent in conventional buck converter current-limiting approaches by sensing the current in the free-wheeling diode in such a manner that an indication is obtained of a current flowing in the power bus, including the buck transistor.

SUMMARY OF THE INVENTION

The foregoing and other problems are overcome and the objects of the invention are realized by, in one embodiment of the invention, a buck-type power conversion circuit that includes (a) a current source having an output for coupling to a load; (b) a first switch having an input coupled to a source of energy and an output coupled to an input of the current source for periodically providing current to the current source; and (c) a second switch having an input coupled to a common potential and an output coupled to the current source for providing current to the current source during a period of time when the first switch is open.

In accordance with the invention the conversion circuit further includes a current sensor coupled in series between the input of the second switch and the ground potential. The current sensor has an output for providing a signal that is indicative of a magnitude of the current provided to the current source, and reflects a current that flowed through the first switch just prior to the first switch being opened.

That is, the current flowing through the current sensor is equal to the current that was flowing in a high side power bus, and is thus an indirect measure of the current that was flowing through a buck transistor. By comparing the voltage developed by the current sensor to a predetermined voltage that is representative of a maximum allowable power bus current, an over-current condition is detected.

In a further embodiment of the invention there is provided a bilateral power conversion circuit that includes (a) an inductance having a first terminal for coupling to a load; (b) a first switch having a first terminal coupled to a source of energy and a second terminal coupled to a second terminal of the inductance; (c) a second switch having a first terminal coupled to a common potential and a second terminal coupled to the second terminal of the inductance; and (d) a controller having an output coupled to the first switch and to the second switch for repetitively opening and closing the switches in such a manner so as to vary the current flow through the inductance and to also sink current from the load or to source current to the load.

In accordance with the invention the bilateral converter further includes a current sensor coupled in series between the first terminal of the second switch and the ground potential. The current sensor has an output for providing an over-current signal to an input of the controller during a time that the bilateral converter is sinking current from the load and also during a time when the bilateral converter is sourcing current to the load.

In a presently preferred embodiment, the bilateral converter is connected to a battery of a space craft for controlling the charging and discharging of the battery.

BRIEF DESCRIPTION OF THE DRAWING

The above set forth and other features of the invention are made more apparent in the ensuing Detailed Description of the Invention when read in conjunction with the attached Drawing, wherein.

DETAILED DESCRIPTION OF THE INVENTION

Figure 1:
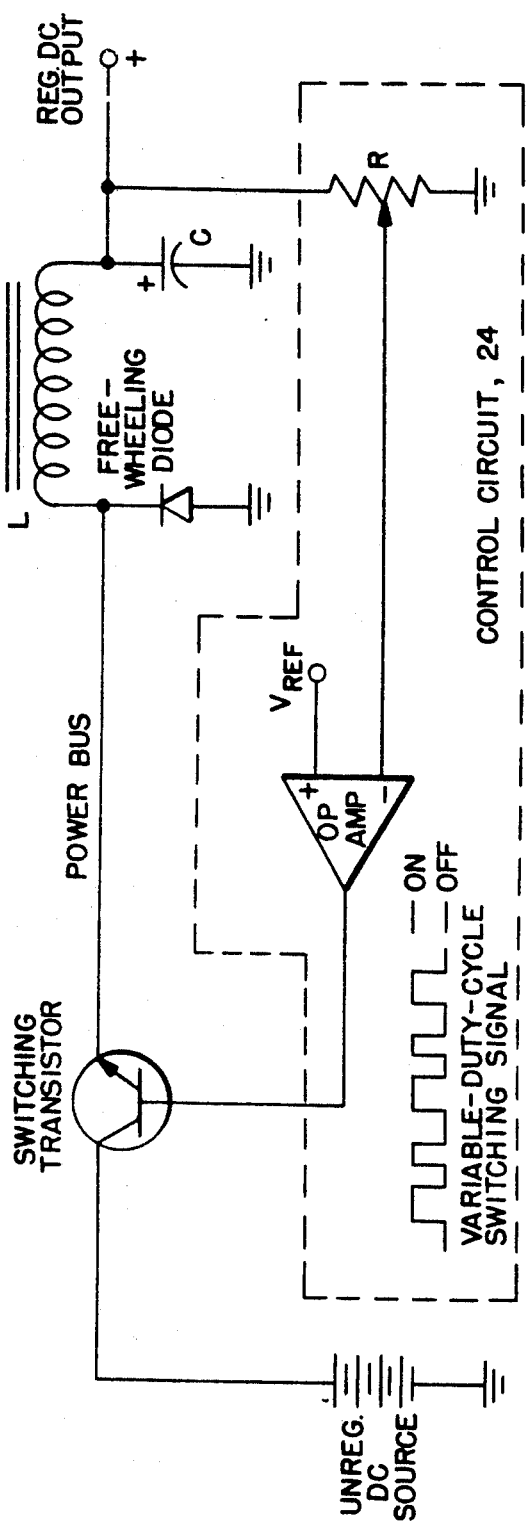
FIG. 1 is a schematic diagram of a buck converter of the prior art.
Figure 2:
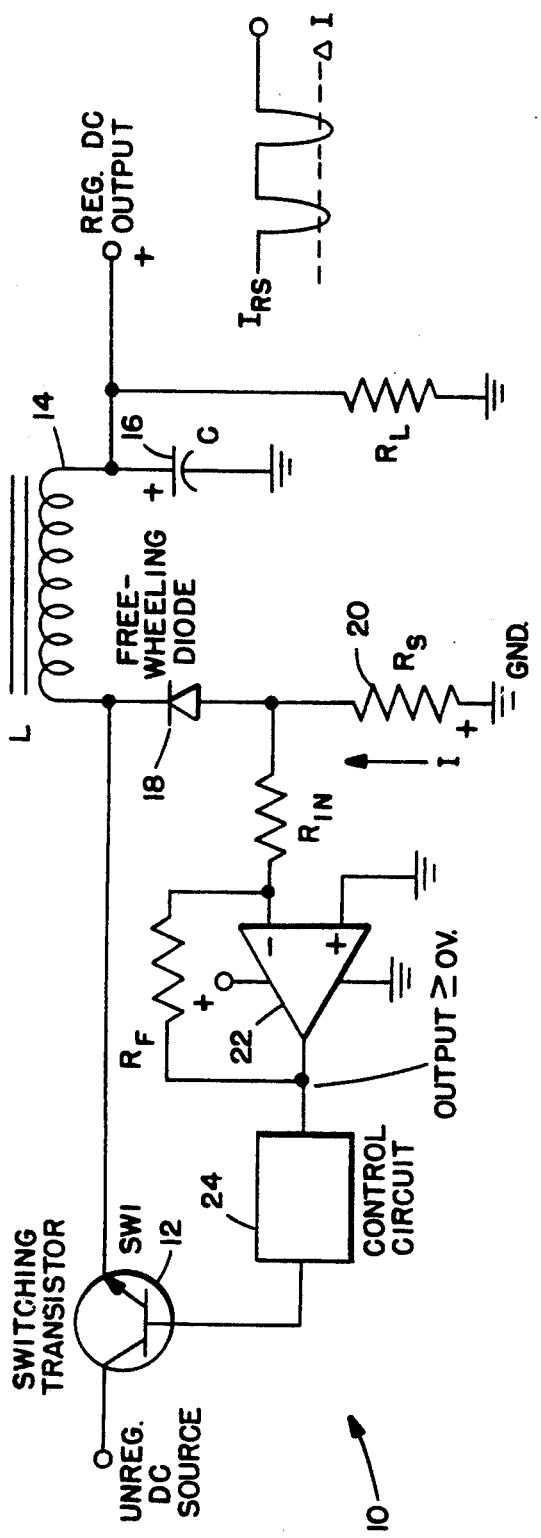
FIG. 2 is a schematic diagram, partially in block diagram form, that illustrates a buck converter that is constructed and operated in accordance with a first embodiment of the invention to include a resistance as a current sensing element in series with the free wheeling diode.

FIG. 2 illustrates a buck converter 10 that includes a switching transistor (SW1) 12, an inductance 14, capacitor 16, and a free wheeling diode 18. These components function as described above in reference to FIG. 1. That is, the switching transistor 12 and free wheeling diode 18 function as switches for alternately providing current to the inductance 14, the inductance 14 functioning as a current source for a load. The load is schematically depicted as a resistance ($R_L$), although the load may also be capacitive or inductive, and need not be purely resistive. The buck converter 10 also includes, in accordance with the invention, a current sensing component that is connected in series between the free wheeling diode 18 and circuit ground (GND). For this embodiment of the invention the current sensing component is embodied in a resistor ($R_S$) 20.

The operation of the buck converter 10 and, in particular, $R_S$ 20 will now be described.

For a case where the inductor L is carrying a maximum allowable current, and if a short circuit appears at the regulated DC output, when SW1 12 turns on the current will rise by an additional $\Delta I$. The additional current $\Delta I$ cannot be more than:

(input voltage)×(period)/(inductance), where the period is 1/frequency. For typical circuit values, $\Delta I$ will be a small portion of the current already flowing.

When SW1 12 turns off, the diode 18 begins to conduct. In that the current through the inductor 14 continues to flow, the current flowing through the diode 18 is initially equal to the current that was flowing through SW1 12 at the time that SW1 12 turned off. Consequently, the (negative) voltage across $R_S$ 20 is proportional to the peak current, and can thus be employed to prevent SW1 12 from conducting until the current returns to an acceptable level, for hysteretic control, or until some predetermined time-out period expires.

That is, the current flowing through $R_S$ 20 is equal to the current that was flowing in the power bus, and is thus an indirect measure of the current that was flowing through SW1 while SW1 was conducting. By comparing the voltage developed across $R_S$ 20 to a predetermined voltage that is representative of a maximum allowable power bus current, an over-current condition is detected.

It should be noted that a negative supply is not required for sensing the over-current condition, in that the signal from $R_S$ 20 may be inverted with a single supply (+) operational amplifier 22 having a virtual ground. Operational amplifier is configured with an input resistor ($R_{IN}$) and a feedback resistor ($R_F$). The output of operational amplifier 22 is thus always equal to or greater than zero volts, and is fed to a control circuit 24 to prevent SW1 12 from conducting, as described above, during an over-current condition.

The circuit configuration of FIG. 2 exhibits none of the disadvantages of the conventional approaches to over-current detection described previously. In that $R_S$ 20 is not in the ground path, the power return and output return are not isolated, so no difference in potential or EMI problems result. Furthermore, the diode 18 does not conduct 100% of the time, assuming a maximum duty cycle for SW1 12. Also, in that the sensed current is not DC, shutdown of SW1 12 can occur within a single cycle. Finally, in that the current flowing in SW1 12 and, thus, the diode 18 current are sensed directly, an over-current signal is generated even in the event of a ground fault.

A further advantage is obtained from the observation that the sensed current is not DC. In the aforementioned conventional ground-sensing approach the sensed current is DC and, consequently, a transformer cannot be used Therefore, to obtain an increased signal level additional power must consumed in the sensing resistor. This degrades the converter efficiency.

Figures 3, 4:
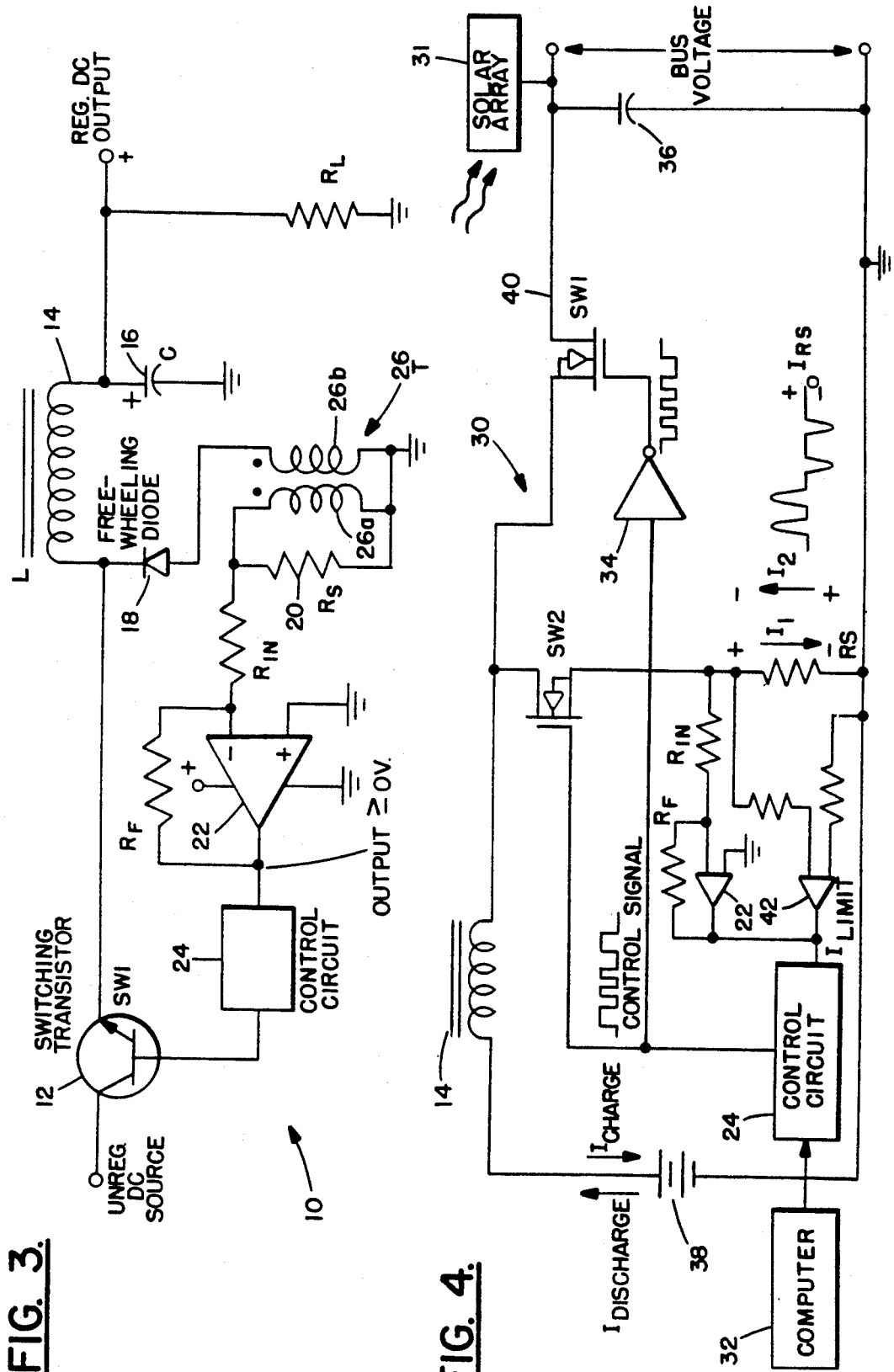
FIG. 3 is a schematic diagram, partially in block diagram form, that illustrates a buck converter that is constructed and operated in accordance with a second embodiment of the invention to include a transformer-coupled resistor as a current sensing element in series with the free wheeling diode.
FIG. 4 is a schematic diagram, partially in block diagram form, that illustrates a bilateral converter that is constructed and operated in accordance with a further embodiment of the invention.

However, and further in accordance with the invention, a current transformer may be used in series with the diode 18 to mirror the current flowing in the diode 18 into $R_S$ 20. The core of the transformer is reset in a known fashion during the time that diode 20 is not conducting. In this embodiment, resistive power loss is maintained at a low level without degrading the current sense signal level. FIG. 3 shows this embodiment of the invention, wherein $R_S$ is connected to a secondary winding 26a of a current transformer (T) 26 having a primary winding 26b that is connected in series between the diode 18 and GND.

FIG. 4 illustrates a further embodiment of the invention employed with a bilateral converter of a type described in the above mentioned commonly assigned U.S. patent application Ser. No. 07/818,842, filed Jan. 10, 1992, entitled "Bilateral Power Converter for a Satellite Power System".

More specifically, FIG. 4 is a simplified block diagram of a satellite power system that is constructed in accordance with the present invention. The satellite power system includes a solar power array 31 and a bilateral converter 30, wherein components that function in a similar manner as in FIGS. 2 and 3 are similarly numbered. The bilateral converter 30 is controlled in part by the satellite's computer 32, and includes the inductor 14, the controller 24, the first switch (SW1), the second switch (SW2), an inverter 34 and a capacitor 36. The bilateral converter 30 is so named in that power can flow both to charge and discharge a battery 38. Thus, the bilateral converter 30 effectively either sinks ($I_{CHARGE}$) or sources ($I_{DISCHARGE}$) current to a bus 40 in response to signals from the control circuit 24.

The battery 38 has a first terminal and a second terminal. The first terminal is coupled to a first end of the inductor 14, and the second terminal is coupled to ground. SW2 is preferably coupled between the second terminal of the battery 38 (ground), through a current sense means, and to a second end of the inductor 14. Thus, when SW2 is in a closed position, the current through the inductor 14 increases in the direction of the bus 40. The capacitor 36 has one end coupled to the second terminal of the battery 38. SW1 is coupled between the second end of the inductor 14 and the other end of the capacitor 36. When SW1 is in a closed position, the current through inductor 14 is increasing in the direction of the battery 38. Therefore, in accordance with the voltage level of the battery 38 and bus 40, and by varying the duty cycle of a control signal received by the SW1 and SW2, the battery 38 is either charged or discharged.

As is described in the above-referenced commonly assigned U.S. patent application, the bilateral converter 30 preferably further employs a single control signal to control the operation of SW1 and SW2. The control signal output by the controller 24 is coupled to activate SW2. The same control signal is also coupled through inverter 34 to activate SW1. In that SW1 and SW2 are activated by control signals that are the inverse of each other, only one of the switches is closed at any particular instant.

In accordance with the invention, the resistance $R_S$ is placed in series with SW2 for sensing over-current conditions. In the bilateral converter 30, when operated in a buck configuration, SW2 functions as a free wheeling device In all cases, SW1 and SW2 are operated out of phase with one another to control the magnitude and the direction of the current through the inductance 14. That is, control circuit 24 closes SW1 and simultaneously opens SW2, and opens SW1 and simultaneously closes SW2.

More particularly, when operated as a buck converter SW2 functions as a free wheeling diode, and when operated as a boost converter, SW1 functions as a free wheeling diode.

In the boost configuration, sensed current is positive ($I_1$), and is employed to shut down the converter 30 by sensing, with a comparator 42, the positive voltage appearing at the top of $R_S$.

Alternatively, when the bilateral converter 30 is operated as a buck converter, with the ground referenced SW2 functioning as the free wheeling diode, the sensed current is negative ($I_2$) and is used for over-current protection as discussed above in reference to FIGS. 2 and 3. For this case, the ground referenced operational amplifier 22 inverts the negative signal appearing at the top of $R_S$.

The outputs of operational amplifiers 22 and 42 are wire-ORed together to form a current limit ($I_{LIMIT}$) signal that is input to an appropriate terminal of the control circuit 24. Thus, in the bilateral converter 30 $R_S$ (or a transformer-coupled sense resistor as in FIG. 3) is employed for over-current protection for both directions of power transfer.

A typical value for $R_S$ is less than one ohm. The value is selected as a function of the magnitude of the expected current flow.

Although described in the context of the specific circuit configurations shown in FIGS. 2, 3, and 4, it should be realized that the teaching of the invention may be employed in power converters having other configurations. Thus, while the invention has been particularly shown and described with respect to exemplary embodiments thereof, it will be understood by those skilled in the art that changes in form and details may be made therein without departing from the scope and spirit of the invention.

What is claimed is:

1. A power conversion circuit, comprising:
   current source means having an output for coupling to a load;
   first switch means having an input coupled to a source of energy and an output coupled to an input of said current source means for periodically providing current to said current source means;
   second switch means having an input coupled to a common potential and an output coupled to said current source means for providing current to said current source means during a period of time when said first switch means is not providing current to said current source means; and
   current sense means coupled in series between said input of said second switch means and said ground potential, said current sense means having an output for providing a signal that is indicative of a magnitude of the current provided to said current source means.

2. A power conversion circuit as set forth in claim 1 and further including control means for varying a duty cycle of said first switch means, and wherein said output of said current sense means is coupled to an input of said control means for modifying the duty cycle when the magnitude of the current exceeds a predetermined threshold.

3. A power conversion circuit as set forth in claim 1 wherein said current sense means includes a resistance having a first terminal connected to said input of said second switch means and a second terminal connected to said ground potential, and wherein said output of said current sense means is connected to said first terminal 4. A power conversion circuit as set forth in claim 1 wherein said current sense means includes a transformer having a primary winding with a first terminal connected to said input of said second switch means and a second terminal connected to said ground potential, said transformer having a secondary winding having a first terminal coupled to said ground potential and a second terminal coupled to a first terminal of a resistance, said resistance having a second terminal coupled to said ground potential, and wherein said output of said current sense means is connected to said first terminal of said resistance.

5. A power conversion circuit as set forth in claim 2 wherein said current sense means includes a resistance that is coupled to said output of said current sense means, wherein a current flow through said second switch means causes a negative polarity signal at said output of said current sense means, and further including amplifier means having an input coupled to said output of said current sense means and an output coupled to said input of said control means, said amplifier means inverting the negative polarity signal to a positive polarity signal.

6. A bilateral power conversion circuit, comprising:
   an inductance having a first terminal for coupling to a load;
   first switch means having a first terminal coupled to a source of energy and a second terminal coupled to a second terminal of said inductance;
   second switch means having a first terminal coupled to a common potential and a second terminal coupled to said second terminal of said inductance;
   control means having an output coupled to said first switch means and to said second switch means for repetitively opening and closing said first and said second switch means in such a manner so as to vary a magnitude or a direction of a flow of current through said inductance, through said first switch means, and through said second switch means for either sinking current from the load or for sourcing current to the load; and
   current sense means coupled in series between said first terminal of said second switch means and said ground potential, said current sense means having an output for providing an over-current signal to an input of said control means during a time that the circuit is sinking current from the load and also during a time when the circuit is sourcing current to the load.

7. A bilateral power conversion circuit as set forth in claim 6 wherein said current sense means includes a resistance having a first terminal connected to said input of said second switch means and a second terminal connected to said ground potential, and wherein said output of said current sense means is connected to said first terminal of said resistance.

8. A bilateral power conversion circuit as set forth in claim 6 wherein said current sense means includes a transformer having a primary winding with a first terminal connected to said input of said second switch means and a second terminal connected to said ground potential, said transformer having a secondary winding having a first terminal coupled to said ground potential and a second terminal coupled to a first terminal of a resistance, said resistance having a second terminal coupled to said ground potential, and wherein said output of said current sense means is connected to said first terminal of said resistance.

9. A bilateral power conversion circuit as set forth in claim 6 wherein a first direction of current flow through said second switch means causes a negative polarity signal at said output of said current sense means, and further including first amplifier means having an input coupled to said output of said current sense means and an output coupled to said input of said control means, said first amplifier means inverting the negative polarity signal to a positive polarity signal and coupling the positive polarity signal to said input of said control means, and wherein a second direction of current flow through said second switch means causes a positive polarity signal at said output of said current sense means, and further including second amplifier means having an input coupled to said output of said current sense means and an output coupled to said input of said control means, said second amplifier means coupling the positive polarity signal to said input of said control means.

10. A bilateral power conversion circuit as set forth in claim 6 wherein said load includes a battery.

11. A bilateral power conversion circuit as set forth in claim 10 wherein said control means operates said first switch means and said second switch means, in a first mode of operation, to charge the battery, and wherein said control means operates said first switch means and said second switch means, in a second mode of operation, to discharge the battery.

* * * * *